(12) United States Patent
Kunze et al.

(10) Patent No.: US 12,474,403 B2
(45) Date of Patent: Nov. 18, 2025

(54) PROBE TIP MODULE, PROBE SYSTEM, AND MEASUREMENT SYSTEM

(71) Applicant: Rohde & Schwarz GmbH & Co. KG, Munich (DE)

(72) Inventors: Alexander Kunze, Munich (DE); Benedikt Lippert, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 757 days.

(21) Appl. No.: 17/554,123

(22) Filed: Dec. 17, 2021

(65) Prior Publication Data
US 2023/0194601 A1 Jun. 22, 2023

(51) Int. Cl.
*G01R 31/317* (2006.01)
*G01R 1/067* (2006.01)

(52) U.S. Cl.
CPC .... *G01R 31/31713* (2013.01); *G01R 1/06766* (2013.01)

(58) Field of Classification Search
CPC ........... G01R 1/06766; G01R 1/06772; G01R 1/06788; G01R 31/31713
See application file for complete search history.

(56) References Cited

U.S. PATENT DOCUMENTS

| | | | | |
|---|---|---|---|---|
| 5,274,336 A * | 12/1993 | Crook | ................ | G01R 1/07 324/755.02 |
| 6,404,215 B1 * | 6/2002 | Nightingale | ....... | G01R 1/07364 439/169 |
| 6,564,158 B1 * | 5/2003 | Rabel | ................ | G01R 29/0892 702/92 |
| 6,725,170 B1 | 4/2004 | Hickman | | |
| 10,330,700 B2 | 6/2019 | Booman et al. | | |
| 2004/0267109 A1 * | 12/2004 | Dancel | ............... | H01R 13/5825 600/407 |
| 2006/0210022 A1 * | 9/2006 | Tan | ....... | G01R 35/005 379/30 |
| 2007/0251461 A1 * | 11/2007 | Reichard | ............. | A01K 63/006 119/245 |
| 2012/0084036 A1 * | 4/2012 | Booman | ............ | G01R 1/06766 702/79 |
| 2013/0003804 A1 * | 1/2013 | Baney | ..................... | H04B 17/17 375/224 |
| 2013/0332100 A1 * | 12/2013 | Young | ................... | G01Q 60/366 702/105 |
| 2013/0343442 A1 * | 12/2013 | Tan | .......... | H04B 3/46 375/224 |
| 2014/0132297 A1 * | 5/2014 | Hwang | .................... | G01R 1/07 324/755.02 |
| 2014/0269812 A1 * | 9/2014 | Deutscher | ................ | G01K 7/18 374/1 |
| 2016/0033455 A1 * | 2/2016 | Knierim | ............ | G01R 1/06766 73/1.82 |
| 2018/0238746 A1 * | 8/2018 | Quant | ...................... | G01K 1/14 |
| 2019/0086503 A1 * | 3/2019 | Simpson | ............. | G01R 35/005 |

\* cited by examiner

*Primary Examiner* — Michael J Dalbo
(74) *Attorney, Agent, or Firm* — CHRISTENSEN O'CONNOR JOHNSON KINDNESS PLLC

(57) ABSTRACT

A probe tip module includes a probe tip interface and a probe tip memory. The probe tip interface is connectable to a probe main module. A reduced characterization data set is stored in the probe tip memory. The prove tip module may be part of a probe system or a measurement system.

12 Claims, 3 Drawing Sheets

PROBE TIP MODULE, PROBE SYSTEM, AND MEASUREMENT SYSTEM

FIELD OF THE DISCLOSURE

Embodiments of the present disclosure generally relate to probe tip modules. Embodiments of the present disclosure further relate to probe systems and to measurement systems.

BACKGROUND

Measurement probes are known in a large variety in the state of the art. In general, such measurement probes are used in combination with a measurement instrument in order to measure certain properties of a device under test.

The measurement probes usually comprise a main body and a probe tip that is attached to the main body. The probe tip is configured to contact corresponding contact points of the device under test, thereby picking up a measurement signal. The measurement signal is then forwarded to the measurement instrument for further analysis.

In order to enhance the precision of measurements conducted by the measurement probe, it is known to correct the acquired measurement data for (inevitable) imperfections of the measurement probe. For example, the measurement probe may comprise a memory comprising a characterization data set, wherein the characterization data set corresponds to a full description of an impulse response or a transfer function of the measurement probe.

Certain types of measurement probes may be usable with different probe tips, i.e., different probe tips may be attachable to the main body of the measurement probe in order to conduct different types of measurement. Accordingly, the different types of probe tips may differ in bandwidth and/or in the way the device under test is contacted.

Different types of probe tips and even different probe tips of the same type of probe tips may have different transmission characteristics. However, these deviations are not captured by the available correction methods.

Thus, there is a need for a probe tip module, a probe system, and a measurement system that allow for a more precise correction of measurement data.

SUMMARY

Embodiments of the present disclosure relate to probe tip modules. The probe tip module or apparatus. In an embodiment, the probe tip module comprises a probe tip interface and a probe tip memory. The probe tip interface is connectable to a probe main apparatus or module. A reduced characterization data set is stored in the probe tip memory.

In some embodiments, for example the embodiment described above, and in the following, the term "module" is understood to denote a physical component or an assembly of physical components that can be used with other physical components or assemblies of physical components in a modular manner. Moreover, the term "reduced characterization data set" is understood to denote a characterization data set having a reduced file size.

In general, the reduced characterization data set comprises information on correction parameters associated with the probe tip module, receiver properties of the probe tip module, and/or transmitter properties of the probe tip module.

The term "correction parameters" relates to parameters that are employed by a measurement instrument in order to compensate for the influence of the probe tip module on measurements. For example, the correction parameters may comprise at least one of a multi-port S-parameter, for example a two-port S-parameter or a four-port S-parameter, an ABCD-parameter, a Z-parameter, a resistance, an impedance, a gain, and/or a DC offset.

The term "receiver properties" may relate to an impulse response, a step response, an amplitude response, a phase response, a frequency response, and/or a transfer function of the probe tip module in a receiver mode of the probe tip module.

The term "transmitter properties" may relate to an impulse response, a step response, an amplitude response, a phase response, a frequency response, and/or a transfer function of the probe tip module in a transmitter mode of the probe tip module.

The probe tip module according to embodiments of the present disclosure is based on the idea to save a characterization data set having a reduced file size in the probe tip memory, namely the reduced characterization data set.

Accordingly, a smaller probe tip memory can be used as less memory space is required to save the reduced characterization data set. Moreover, a memory interface of the probe tip memory having a lower data rate is sufficient to transmit the reduced characterization data set to the probe tip interface. Thus, a more cost-efficient probe tip memory may be used.

Moreover, the probe tip interface only has to transmit the reduced characterization data set to the probe main module. Accordingly, a more cost-efficient probe tip interface having a reduced data rate may be used.

Further, the reduced characterization data set can be transmitted to the probe main module faster due to the reduced file size of the reduced characterization data set.

In some embodiments, probe tip modules usually do not allow for implementing a larger and faster memory comprising a full characterization data set associated with the probe tip module. However, the reduced requirements on the probe tip memory described above allow for implementing the probe tip memory with the reduced characterization data set in the probe tip module nevertheless.

Accordingly, the influence of the particular probe tip module at hand on measurements to be conducted can be precisely corrected based on the reduced characterization data set.

However, the reduced characterization data set may be, at least taken by itself, insufficient for a complete description of the correction parameters, receiver properties and/or transmitter properties of the probe tip module. The additional information necessary to obtain the complete description of the correction parameters receiver properties and/or transmitter properties of the probe tip module may be saved in a memory of the probe main module and/or in a memory of a measurement instrument, as will be described in more detail below.

The reduced characterization data set may be generated during the manufacturing of the probe tip module.

For example, the correction parameters, receiver properties and/or transmitter properties of the respective probe tip module may be measured and the corresponding reduced characterization data set may be determined and saved in the probe tip memory.

In some embodiments, the reduced characterization data set may be determined for each individual manufactured probe tip module.

Alternatively, a common reduced characterization data set may be determined for a batch of manufactured probe tip modules by measuring the correction parameters, receiver properties and/or transmitter properties of a sub-set of the batch. For example, the sub-set may be a random sample of one or several manufactured probe tip modules of the batch. The common reduced characterization data set may be saved in the probe tip memories of all probe tip modules of the batch.

According to an aspect of the present disclosure, the reduced characterization data set comprises at least one of a reduced number of support points, a reduced resolution, a reduced number of parameters, a model function, and/or model function parameters.

Thus, a full characterization data set may be determined and decimated in order to obtain the reduced characterization data set, such that the reduced characterization data set comprises a reduced number of support points compared to the full characterization data set. Accordingly, the reduced characterization data set may comprise less than or equal to 20 support points, for example less than or equal to ten support points, for example less than or equal to five support points.

Alternatively or additionally, values of the individual support points may be rounded, such that the reduced characterization data set comprises a reduced resolution compared to the full characterization data set.

Alternatively or additionally, the reduced characterization data set may have a reduced number of parameters, such that the reduced characterization data set describes only a certain sub-set of correction parameters, receiver properties and/or transmitter properties of the probe tip module, for example only a sub-set of properties that is known to vary between different probe tip modules of the same type.

Alternatively or additionally, the reduced characterization data set may comprise a model function describing the correction parameters, receiver properties, and/or transmitter properties of the probe tip module. For example, the model function may be a rational function, a polynomial, etc.

However, it is to be understood that any other suitable model function may be used in order to describe the correction parameters, receiver properties and/or transmitter properties of the probe tip module.

In some embodiments, the reduced characterization data set may comprise only the model function parameters, e.g., the coefficients of the rational function or of the polynomial.

According to a further aspect of the present disclosure, the probe tip module is configured to receive and/or transmit radio frequency (RF) signals. In other words, the probe tip module may be configured to receive RF signals from a device under test. Alternatively or additionally, the probe tip module may be configured to transmit RF signals to a device under test. Thus, the probe tip module and the probe main module may establish an RF probe.

Accordingly, the reduced characterization data set may comprise information on RF correction parameters associated with the probe tip module, RF receiver properties of the probe tip module, and/or RF transmitter properties of the probe tip module.

In an embodiment of the present disclosure, the reduced characterization data set corresponds to a deviation from a default characterization data set. In other words, the reduced characterization data set comprises information on deviations of the correction parameters from default correction parameters, deviations of the receiver properties from default receiver properties, and/or deviations of the transmitter properties from default transmitter properties. As only the deviations of the properties associated with the reduced characterization data set from the default properties are saved in the probe tip memory, the file size of the reduced characterization data set can be reduced significantly.

Therein and in the following, the term "default correction parameters" is understood to denote predetermined correction parameters associated with the respective type of the probe tip module. For example, the default correction parameters may be obtained by determining the correction parameters associated with different probe tip modules of the same type. In some embodiments, the determined correction parameters may be averaged in order to obtain the default correction parameters.

Moreover, the term "default receiver properties" is understood to denote predetermined receiver properties of the respective type of the probe tip module. For example, the default receiver properties may be obtained by determining the receiver properties of several different probe tip modules of the same type. In some embodiments, the determined receiver properties of the several probe tip modules may be averaged in order to obtain the default receiver properties.

Further, the term "default transmitter properties" is understood to denote predetermined transmitter properties of the respective type of the probe tip module. For example, the default transmitter properties may be obtained by determining the transmitter properties of several different probe tip modules of the same type. In some embodiments, the determined transmitter properties of the several probe tip modules may be averaged in order to obtain the default transmitter properties.

In a further embodiment of the present disclosure, the probe tip module comprises two parallel lines and tip contacts for single-ended measurements, differential measurements, and/or common mode measurements. Thus, different types of measurements may be conducted by the probe tip module, namely measurements of the voltage of a single contact against a mass reference, measurements of the voltage difference between two contacts, and/or measurements of the common mode signal of two contacts with respect to a common mass reference.

Another aspect of the present disclosure provides that the probe tip module is switchable between a single-ended measurement mode, a differential measurement mode, and a common measurement mode. Thus, the different types of measurements can be conducted with the same probe tip module, i.e., without interchanging the probe tip module between measurements.

In a further embodiment of the present disclosure, the probe tip module comprises at least one solder-in tip contact. Thus, at least one tip contact of the probe tip module may be connected to the rest of the probe tip module by soldering the at least one solder-in contact to a corresponding contact of the at least one tip contact.

Embodiments of the present disclosure further relate to probe systems. In an embodiment, a probe system comprises a probe tip module and a probe main module. The probe tip module comprises a probe tip interface and a probe tip memory. The probe tip interface is connectable to the probe main module. A reduced characterization data set is stored in the probe tip memory. The probe main module comprises a measurement amplifier.

In general, the measurement amplifier is configured to amplify a measurement signal received from the probe tip module, such that the resulting amplified measurement signal can be adequately transmitted to a measurement instrument. Alternatively or additionally, the measurement amplifier is configured to amplify a measurement signal received from a measurement instrument, such that a measurement signal of appropriate voltage is applied to a device under test via the probe tip module.

Regarding the further advantages and properties of the probe system, reference is made to the explanations given above with respect to the probe tip module, which also hold for the probe system and vice versa.

According to an aspect of the present disclosure, the probe main module comprises a main module memory, wherein a main characterization data set is stored in the main module memory. In general, the main characterization data set comprises information on correction parameters associated with the probe main module, receiver properties of the probe main module, and/or transmitter properties of the probe main module. In contrast to the reduced characterization data set associated with the probe tip module, the main characterization data set may comprise all information necessary for correcting the influence of the probe main module on measurements conducted by the probe system.

Thus, the influence of the probe system on measurements conducted by the probe system can be corrected based on the main characterization data set and based on the reduced characterization data set. However, additional information on the influence of the probe tip module may be necessary in order to correct for the influence of the probe tip module, as is described in more detail below.

According to another aspect of the present disclosure, a default characterization data set is stored in the main module memory. The default characterization data set may comprise information on default correction parameters associated with the probe tip module, default receiver properties and/or default transmitter properties of the probe tip module.

Therein and in the following, the term "default correction parameters" is understood to denote predetermined correction parameters associated with the respective type of the probe tip module. For example, the default correction parameters may be obtained by determining the correction parameters associated with different probe tip modules of the same type. In some embodiments, the determined corrections parameters may be averaged in order to obtain the default correction parameters.

Moreover, the term "default receiver properties" is understood to denote predetermined receiver properties of the respective type of the probe tip module. For example, the default receiver properties may be obtained by determining the receiver properties of several different probe tip modules of the same type. In some embodiments, the determined receiver properties of the several probe tip modules may be averaged in order to obtain the default receiver properties.

Further, the term "default transmitter properties" is understood to denote predetermined transmitter properties of the respective type of the probe tip module. For example, the default transmitter properties may be obtained by determining the transmitter properties of several different probe tip modules of the same type. In some embodiments, the determined transmitter properties of the several probe tip modules may be averaged in order to obtain the default transmitter properties.

For example, the reduced characterization data set comprises information on deviations from the default properties of the probe tip module. Thus, the influence of the probe tip module can be correctly compensated due to the knowledge of the default properties and the deviations from these default properties.

According to an aspect of the present disclosure, the probe tip module and the probe main module establish a handheld measurement probe for performing manual measurements. Accordingly, the probe main module and/or the probe tip module may comprise a handle or other suitable holding means such that a user can hold the probe main module and/or the probe tip module in his hands.

Thus, in order to perform measurements, the user may manually move the probe main module and/or the probe tip module such that at least one tip contact of the probe tip module contacts a contact point of a device under test.

In other words, the probe system relates to a manual probe system, namely a probe system that is operated manually.

Embodiments of the present disclosure further relate to measurement systems. In an embodiment, a measurement system comprising a probe system and a measurement instrument. The probe system comprises a probe tip module and a probe main module. The probe tip module comprises a probe tip interface and a probe tip memory. The probe tip interface is connectable to the probe main module. A reduced characterization data set is stored in the probe tip memory. The probe main module comprises a measurement amplifier. The probe main module comprises a main module interface being connectable to the measurement instrument.

The measurement instrument may be an oscilloscope, for example a digital oscilloscope. However, the measurement instrument may be established as any other suitable type of measurement instrument, for example as a signal analyzer, a spectrum analyzer, or a vector network analyzer.

Regarding the further advantages and properties of the measurement system, reference is made to the explanations given above with respect to the probe tip module and with respect to the probe system, which also hold for the measurement system and vice versa.

In a further embodiment of the present disclosure, the measurement instrument comprises a measurement instrument memory, wherein a default characterization data set is stored in the measurement instrument memory. The default characterization data set may comprise information on default correction parameters, default receiver properties and/or default transmitter properties of the probe tip module, as already described above. The default characterization data set and the reduced characterization data set together provide all information necessary in order to correctly compensate the influence of the probe tip module on measurements.

In other words, the additional information necessary for compensating the influence of the probe tip module, namely the default characterization data set, may be saved in the measurement instrument memory.

According to an aspect of the present disclosure, the probe main module comprises a main module memory, wherein a main characterization data set is stored in the main module memory. In general, the main characterization data set comprises information on correction parameters associated with the probe main module, receiver properties of the probe main module and/or transmitter properties of the probe main module, as already described above.

According to a further aspect of the present disclosure, a default characterization data set is stored in the main module memory, wherein the main module interface is configured to forward the default characterization data set to the measurement instrument. The default characterization data set may comprise information on default correction parameters, default receiver properties and/or default transmitter properties of the probe tip module, as already described above. The default characterization data set and the reduced characterization data set together provide all information necessary in order to correctly compensate the influence of the probe tip module on measurements.

In other words, the additional information necessary for compensating the influence of the probe tip module, namely the default characterization data set, may be saved in the main module memory, and may be transmitted to the measurement instrument via the main module interface.

Another aspect of the present disclosure provides that the measurement instrument comprises a correction circuit, wherein the correction circuit is configured to determine at least one correction parameter associated with at least the probe tip module based on the reduced characterization data set. Thus, the measurement instrument or rather the correction circuit is configured to reconstruct the at least one correction parameter based on the potentially incomplete information available in the reduced characterization data set.

The at least one correction parameter may be associated with at least one of a multi-port S-parameter, an ABCD-parameter, a Z-parameter, a resistance, an impedance, a gain, and/or a DC offset. However, the at least one correction parameter may relate to any other parameter that is adaptable in order to compensate for the influence of the probe tip module.

In an embodiment of the present disclosure, the correction circuit is configured to determine the at least one correction parameter based on the reduced characterization data set and based on a default characterization data set. For example, the reduced characterization data set comprises information on deviations from the default properties of the probe tip module. Thus, the influence of the probe tip module can be correctly compensated due to the knowledge of the default properties and the deviations from these default properties.

In some embodiments, the correction circuit is configured to interpolate the reduced characterization data set, extrapolate the reduced characterization data set, and/or fit the reduced characterization data set to a model function in order to determine the at least one correction parameter. Thus, information that is potentially missing in the reduced characterization data set is reconstructed and can be used for compensating the influence of the probe tip module on the measurements to be conducted.

According to another aspect of the present disclosure, the correction circuit is configured to determine the at least one correction data set based on user input data. For example, the measurement instrument and/or the main probe module may comprise a user interface that is configured to receive the user input. For example, the user input may relate to the type of the probe tip module, to the type of measurement to be conducted, to the distance between tip contacts of the probe tip module, and/or to the type of connection between the probe tip module and the probe main module.

A further aspect of the present disclosure provides that the measurement instrument comprises an analysis circuit, wherein the analysis circuit is configured to analyze a measurement signal received from the probe system, thereby obtaining measurement data, and wherein the analysis circuit is configured to correct the measurement data based on the at least one correction parameter. Thus, the influence of the probe tip module on the conducted measurements is compensated in a particularly precise manner, as the individual properties of the probe tip module are taken into account in the analysis of the measurement signal.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
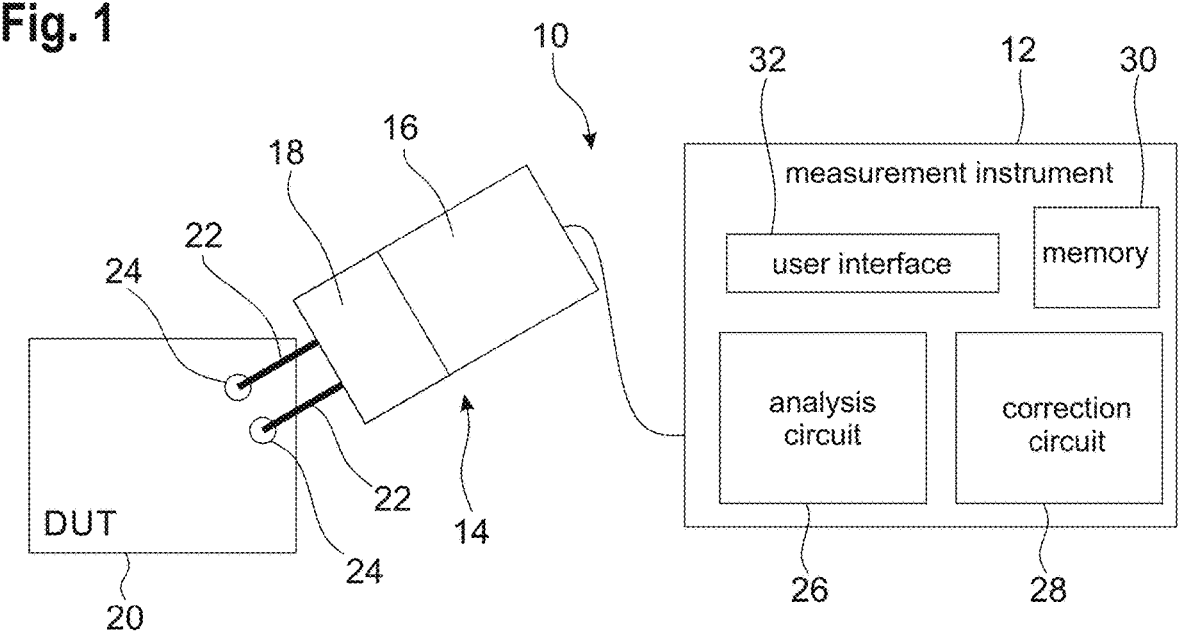
FIG. 1 schematically shows a measurement system according to an embodiment of the present disclosure.

FIG. 1 schematically shows an example of a measurement system 10. The measurement system 10 comprises a measurement instrument 12 and a probe system 14 that is connected to the measurement instrument 12 in a signal transmitting manner.

Therein and in the following, the term "connected in a signal transmitting manner" is understood to denote a cable-based or wireless connection that is configured to transmit signals between the respective devices or components.

The measurement instrument 12 may be established as an oscilloscope, for example as a digital oscilloscope. However, it is to be understood that the measurement instrument 12 may be established as any other suitable measurement instrument, for example as a signal analyzer, as a spectrum analyzer, or as a vector network analyzer.

In the embodiment shown, the probe system 14 comprises a probe main module 16 and a probe tip module 18 that is attached to the probe main module 16. In general, the probe tip module 18 and the probe main module 16 establish a handheld measurement probe for performing manual measurements. In other words, the probe system 14 is a manual probe system. Accordingly, the probe main module and/or the probe tip module may comprise a handle or other suitable holding means such that a user can hold the probe main 16 module and/or the probe tip module 18 in his hands.

In an embodiment, the probe main module 16 and the probe tip module 18 establish an RF measurement probe, for example a high-bandwidth RF probe. The RF measurement probe may have a predefined bandwidth, e.g., a bandwidth between 0.5 GHz and 20 GHz, for example between 1.5 GHz and 16 GHz.

Therein and in the following, the term "module" is understood to denote a physical component or an assembly of physical components that can be used with other physical components or assemblies of physical components in a modular manner.

In general, the measurement system 10 is configured to conduct measurements on a device under test 20. The probe system 14, or more precisely the probe tip module 18 comprises one or several tip contacts 22 that are configured to establish an electrical connection with one or several predetermined contact points 24 on the device under test 20.

As the probe main module 16 and the probe tip module 18 establish a handheld measurement probe, a user may manually move the probe main module 16 and/or the probe tip module 18 such that the at least one tip contact 22 of the probe tip module 18 contacts the at least one contact point 24 of the device under test 20.

For example, a measurement signal, for example a DC voltage or an AC voltage, is picked up from the contact points 24 and is transmitted to the measurement instrument 12. The measurement signal is then analyzed by an analysis circuit 26 of the measurement instrument 12.

The measurement instrument 12 may also comprise a correction circuit 28 that is configured to determine at least one correction parameter in order to compensate for the influence of the probe system 14 on the conducted measurements. Data sets that are relevant for compensating the influence of the probe system may be saved in a measurement instrument memory 30 of the measurement instrument 12. This will be described in more detail below. Moreover, settings of the measurement instrument 12 that are related to the measurements conducted may be set by a user via a user interface 32 of the measurement instrument 12.

It is also conceivable that a test signal is generated by the measurement instrument 12 and forwarded to the contact points 24 by the probe system 14. Afterwards, a response signal of the device under test 20 may be measured as described above.

The probe system 14 may be switchable between different measurement modes, for example between a single-ended measurement mode, a differential measurement mode, and a common mode. Thus, different types of measurements may be conducted by the probe tip module 18, namely measurements of the voltage of a single contact point 24 against a mass reference, measurements of the voltage difference between two contact points 24, and measurements of the common mode signal of two contact points 24 with respect to a common mass reference.

Figure 2:
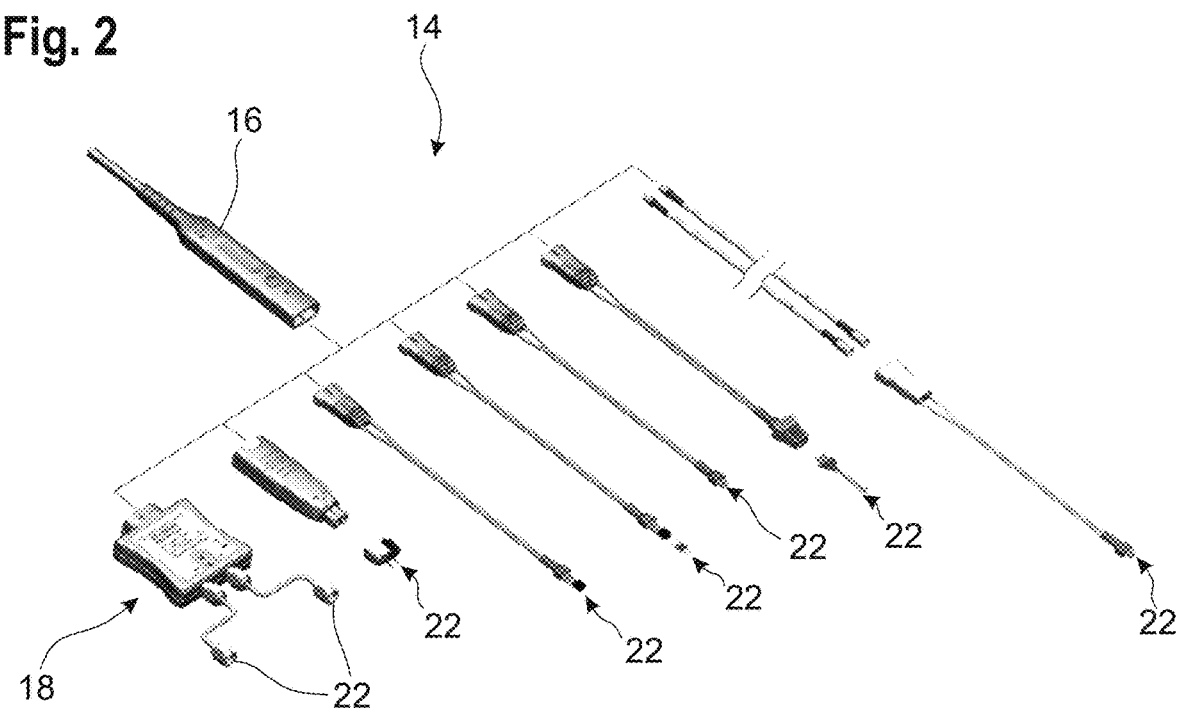
FIG. 2 schematically shows a representative probe system with different probe tip modules.

In some embodiments, the different types of measurements may be conducted with the same probe tip module 18, i.e., without interchanging the probe tip module 18. However, as is shown in FIG. 2, the probe main module 16 may be connectable with a plurality of different types of probe tip modules 18, such that different requirements of different devices under test 20 can be met.

The different types of probe tip modules 18 may be connectable to the probe main module 16 by any suitable type of connection, for example by force-fit connections, form-fit connections, and/or firmly bonded connections.

Figure 3:
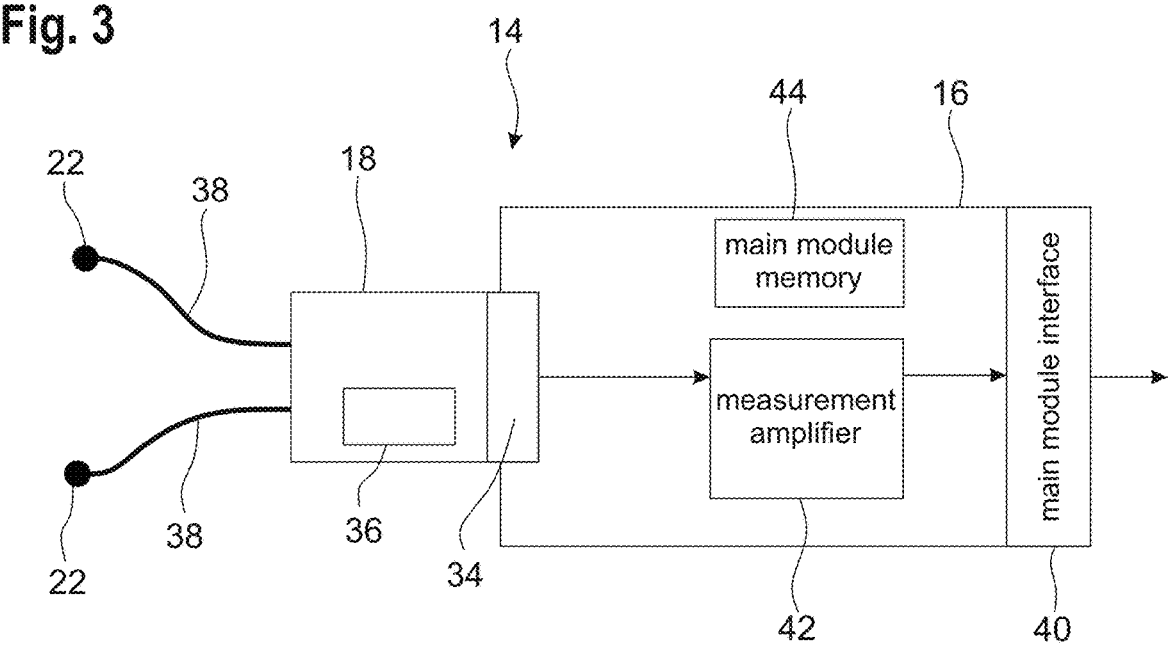
FIG. 3 schematically shows a representative probe system of the measurement system of FIG. 1 in more detail.

FIG. 3 schematically shows the probe system 14 in more detail. The probe tip module 18 comprises a probe tip interface 34 that is connectable to the probe main module 16, for example by any of the connection types described above. The probe tip module 18 further comprises a probe tip memory 36, wherein a reduced characterization data set is stored in the probe tip memory 36.

As is illustrated in FIG. 3, the tip contacts 22 may be connected to the rest of the probe tip module 18 via cables or other components 38. In general, the tip contacts 22 may be connected to the cables or other components 38 by any suitable type of connection, for example by force-fit connections, form-fit connections, and/or firmly bonded connections such as soldering.

For example, at least one tip contact 22 of the probe tip module 18 may be connected to the rest of the probe tip module 18 by soldering at least one solder-in contact of the probe-tip module 18 to a corresponding contact of the at least one tip contact 22.

The probe main module 16 comprises a main module interface 40 that is connectable to the measurement instrument 12, for example via a suitable cable. The probe main module 16 further comprises a measurement amplifier 42. In general, the measurement amplifier 42 is configured to amplify a measurement signal received from the probe tip module 18, such that the resulting amplified measurement signal can be adequately transmitted to a measurement instrument 12.

Alternatively or additionally, the measurement amplifier 42 is configured to amplify a measurement signal received from a measurement instrument 12, such that a measurement signal of appropriate voltage is applied to a device under test 20 via the probe tip module 18.

The probe main module 16 is a main module memory 44, wherein at least a main characterization data set is stored in the main module memory 44. The main characterization data set comprises information on correction parameters associated with the probe main module 16, receiver properties of the probe main module 16, and/or transmitter properties of the probe main module 16.

Further a default characterization data set associated with the probe tip module 18 is stored either in the main module memory 44 or in the measurement instrument memory 30.

In general, the reduced characterization data set, the default characterization data set, and the main characterization data set are transmitted to the correction circuit 28, and the correction circuit 28 corrects measurements performed via the probe system 14 based on these data sets.

Therein, the reduced characterization data set comprises information on correction parameters associated with the probe tip module 18, receiver properties of the probe tip module 18, and/or transmitter properties of the probe tip module 18.

Therein and in the following, the term "correction parameters" relates to parameters that are employed by the measurement instrument 12 in order to compensate for the influence of the respective component on measurements. For example, the correction parameters may comprise at least one of a multi-port S-parameter, for example a two-port S-parameter or a four-port S-parameter, an ABCD-parameter, a Z-parameter, a resistance, an impedance, a gain, and/or a DC offset.

The term "receiver properties" may relate to an impulse response, a step response, an amplitude response, a phase response, a frequency response, and/or a transfer function of the respective component in a receiver mode.

The term "transmitter properties" may relate to an impulse response, a step response, an amplitude response, a phase response, a frequency response, and/or a transfer function of the respective component in a transmitter mode.

Due to the usually strict restrictions on the size and the performance of the probe tip memory 36, the reduced characterization data set has a reduced file size. Thus, the reduced characterization data set comprises at least one of a reduced number of support points, a reduced resolution, a reduced number of parameters, a model function, and/or model function parameters.

Accordingly, a full characterization data set may be determined and decimated in order to obtain the reduced characterization data set, such that the reduced characterization data set comprises a reduced number of support points compared to the full characterization data set.

The reduced characterization data set may comprise less than or equal to 20 support points, for example less than or equal to ten support points, for example less than or equal to five support points.

Alternatively or additionally, values of the individual support points may be rounded, such that the reduced characterization data set comprises a reduced resolution compared to the full characterization data set.

Alternatively or additionally, the reduced characterization data set may have a reduced number of parameters, such that the reduced characterization data set describes only a certain sub-set of correction parameters, receiver properties and/or transmitter properties of the probe tip module 18, for example only a sub-set of properties that is known to vary between different probe tip modules 18 of the same type.

Alternatively or additionally, the reduced characterization data set may comprise a model function describing the correction parameters, receiver properties, and/or transmitter properties of the probe tip module 18. For example, the model function may be a rational function, a polynomial, etc.

However, it is to be understood that any other suitable model function may be used in order to describe the correction parameters, receiver properties and/or transmitter properties of the probe tip module 18.

In some embodiments, the reduced characterization data set may comprise only the model function parameters, e.g., the coefficients of the rational function or of the polynomial.

Figure 4:
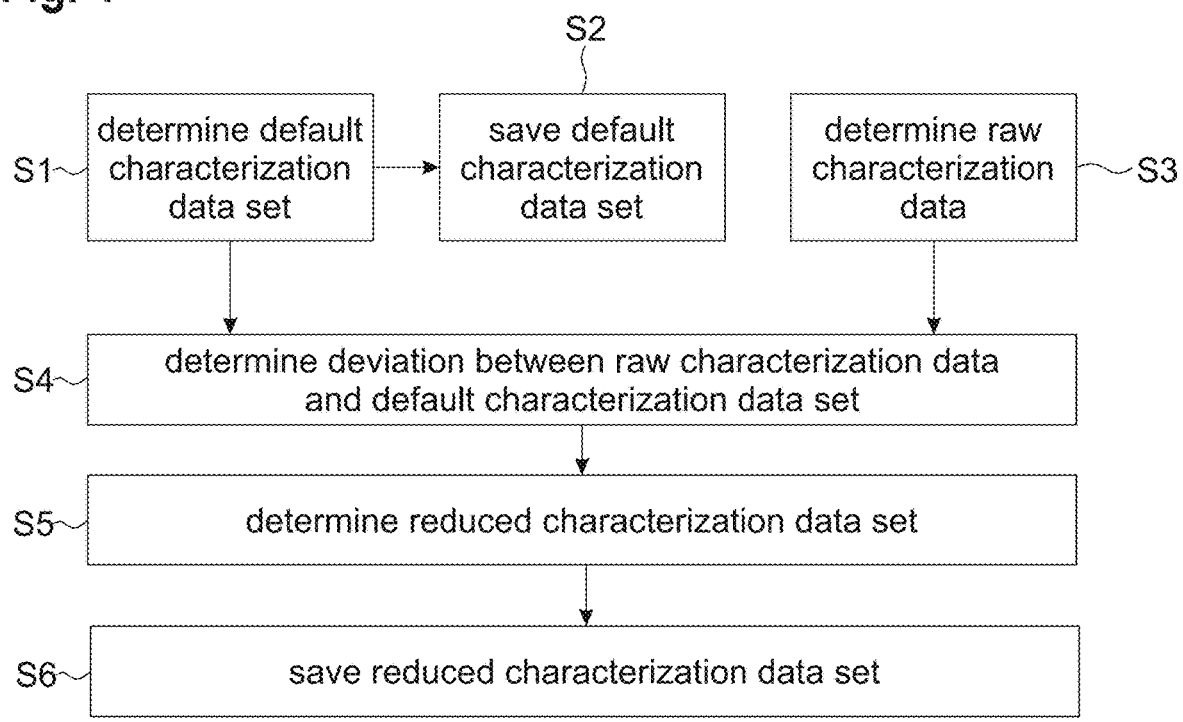
FIG. 4 shows a flow chart of a representative method of determining a reduced characterization data set in accordance with an embodiment of the disclosure.

One particular example of a method of determining the reduced characterization data set is described in the following with reference to FIG. 4.

The default characterization data set is determined (step S1).

In general, the default characterization data set comprises information on default correction parameters associated with the probe tip module 18, default receiver properties of the probe tip module 18 and/or default transmitter properties of the probe tip module 18.

The default characterization data set corresponds to standard properties of the probe tip module 18. Accordingly, the relevant parameters of a known-good probe tip module 18 (which may also be called a "golden device") may be measured and the default characterization data set may be determined based on the measured parameters. Alternatively, the relevant parameters of several probe tip modules 18 of the same type may be measured and averaged in order to determine the default characterization data set.

The determined default characterization data set is saved in the main module memory 44 and/or in the measurement instrument memory 30 (step S2).

Raw characterization data is determined (step S3). The raw characterization data may be obtained by measuring the relevant parameters of the probe tip module 18 for which the reduced characterization data set is to be determined, analogously to step S1. For example, the raw characterization data may be obtained for every individual probe tip module 18 during manufacturing of the probe tip module 18.

However, the raw characterization data may be obtained for a certain sub-set of a batch of manufactured probe tip modules 18. For example, the sub-set may be a random sample of one or several manufactured probe tip modules 18 of the batch. The individual results may be averaged in order to obtain the raw characterization data.

A deviation between the raw characterization data and the default characterization data set is determined, thereby obtaining a deviation data set (step S4).

The deviation data set may correspond to the difference between the raw characterization data and the default characterization data set. Alternatively or additionally, the deviation data set may correspond to a quotient of the raw characterization data and the default characterization data set.

The reduced characterization data set is determined based on the determined deviation between the raw characterization data and the default characterization data set (step S5).

In some embodiments, the reduced characterization data set may correspond to the determined deviation data set. However, the deviation data set may be further modified in order to reduce the file size of the deviation data set.

In some embodiments, the number of support points of the deviation data set may be reduced, the resolution of the deviation data set may be reduced, the number of parameters of the deviation data set may be reduced, a model function may be fit to the deviation data set, and/or model function parameters of the model function may be determined, as already described above in more detail.

The determined reduced characterization data set is saved in the probe tip memory 36 (step S6).

Due to the reduced file size, the reduced characterization data set may be, at least taken by itself, insufficient for the correction circuit 28 to determine the at least one correction parameter associated with the probe tip module 18.

However, the reduced characterization data set and the default characterization data set together provide all information that is necessary in order to determine the at least one correction parameter.

Figure 5:
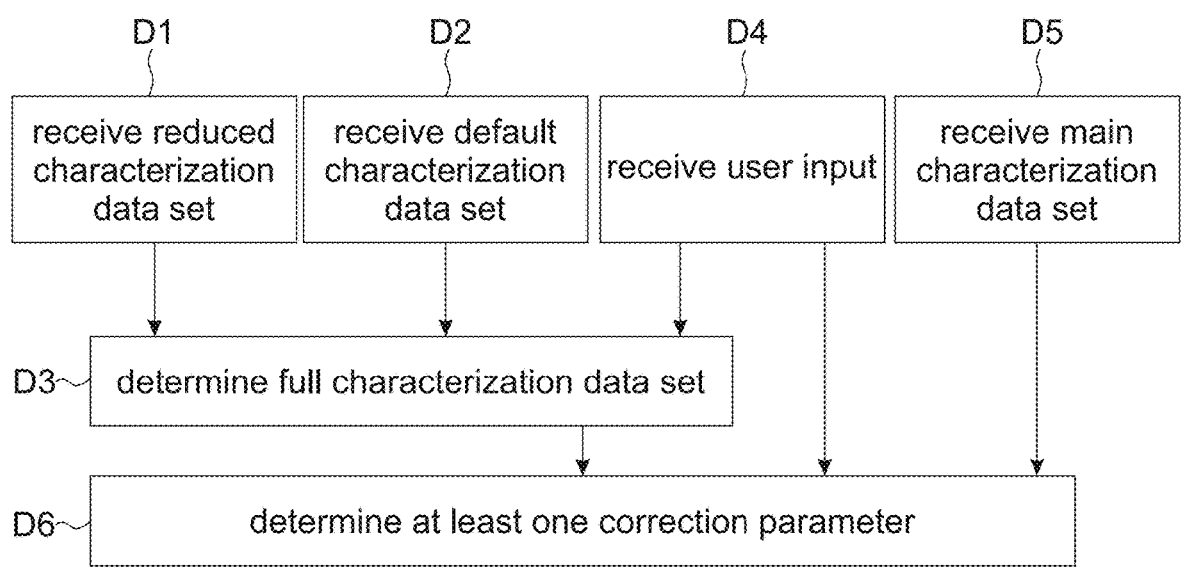
FIG. 5 shows a flow chart of a representative method of determining correction parameters in accordance with an embodiment of the disclosure.

One particular example of a method of determining the at least one correction parameter is described in the following with reference to FIG. 5.

The reduced characterization data set is received by the correction circuit 28 (step D1).

Moreover, the default characterization data set is received by the correction circuit 28 (step D2).

The default characterization data set and the reduced characterization data set are combined in order to determine a full characterization data set (step D3).

In general, the full characterization data set comprises all information necessary in order to compensate for the influence of the probe tip module 18 on the measurements performed. More precisely, the full characterization data set comprises all relevant information regarding the correction parameters associated with the probe tip module 18, receiver properties of the probe tip module 18, and/or transmitter properties of the probe tip module 18.

The correction circuit 28 may interpolate the reduced characterization data set, extrapolate the reduced characterization data set, and/or fit the reduced characterization data set to a model function before combining the reduced characterization data set with the default characterization data set.

Optionally, user input may be received via the user interface 32 (step D4).

For example, the user input may relate to the type of the probe tip module 18, to the type of measurement to be conducted, to the distance between the tip contacts 22 of the probe tip module 18, and/or to the type of connection between the probe tip module 18 and the probe main module 16.

The user input may be taken into account by the correction circuit 28 for determining the full characterization data set.

The main characterization data set is received by the correction circuit 28 (step D5).

The correction circuit determines the at least one correction parameter based on the full characterization data set and based on the main characterization data set (step D6).

Optionally, the at least one correction parameter is determined based on the received user input.

When measurements are performed by the measurement system 10, the analysis circuit 26 analyzes a measurement signal received from the probe system 14, thereby obtaining measurement data.

The analysis circuit 26 further corrects the obtained measurement data based on the at least one correction parameter, such that the influence of the probe tip module 18 and the influence of the probe main module 16 are correctly compensated.

Therein, the influence of the probe tip module 18 on the conducted measurements is compensated, as the full characterization data set is taken into account. Moreover, the influence of the probe main module 16 on the conducted measurements is compensated, as the main characterization data set is taken into account.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of hardware circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors, such as, for example, microprocessors, or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, devices, etc., capable of implemented the functionality described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A probe system, comprising:
   a probe main module comprising a measurement amplifier and a main module memory; and
   a probe tip module comprising a probe tip interface and a probe tip memory, wherein the probe tip interface is connectable to the probe main module,
   wherein a reduced characterization data set is stored in the probe tip memory, the reduced characterization data set comprising information on at least one of correction parameters associated with the probe tip module, receiver properties of the probe tip module, or transmitter properties of the probe tip module,
   wherein the reduced characterization data set is insufficient for a complete description of the at least one of the correction parameters, the receiver properties, or the transmitter properties of the probe tip module, such that the reduced characterization data set has a reduced file size compared to a full characterization data set that is sufficient for a complete description of the at least one of the correction parameters, the receiver properties, or the transmitter properties of the probe tip module, wherein the reduced characterization data set is insufficient to determine the at least one of the correction parameters, the receiver properties, or the transmitter properties of the probe tip module, wherein a default characterization data set is stored in the main module memory, wherein the default characterization data set comprises at least one of default correction parameters, default receiver properties, or default transmitter properties of the probe tip module, wherein the default characterization data set together with the reduced characterization data set is sufficient for a complete description of the at least one of the correction parameters, the receiver properties, or the transmitter properties of the probe tip module, and wherein the reduced characterization data set comprises only deviations of the correction parameters of the probe tip module from the default correction parameters, of the receiver properties of the probe tip module from the default receiver properties, and/or of the transmitter properties of the probe tip module from the default transmitter properties.

2. The probe system of claim 1, wherein the probe tip module and the probe main module establish a handheld measurement probe for performing manual measurements.

3. The probe system of claim 1, wherein the reduced characterization data set comprises at least one of a reduced number of support points, a reduced resolution, a reduced number of parameters, a model function, or model function parameters.

4. The probe system of claim 1, wherein the probe tip module is configured to receive or transmit radio frequency (RF) signals.

5. The probe system of claim 1, wherein the probe tip module comprises two parallel lines and tip contacts for single-ended measurements, differential measurements, or common mode measurements.

6. The probe system of claim 1, wherein the probe tip module is switchable between a single-ended measurement mode, a differential measurement mode, and a common measurement mode.

7. The probe system of claim 1, wherein the probe tip module comprises at least one solder-in tip contact.

8. A measurement system, comprising:
a measurement instrument comprising a measurement instrument memory;
a probe system comprising a probe tip module and a probe main module,
wherein the probe main module comprises a measurement amplifier, a main module interface being connectable to the measurement instrument, and a main module memory, wherein a main characterization data set is stored in the main module memory, and wherein the main module interface is configured to forward the main characterization data set to the measurement instrument,
wherein the probe tip module comprises a probe tip interface and a probe tip memory, wherein the probe tip interface is connectable to the probe main module, wherein a reduced characterization data set is stored in the probe tip memory,
wherein the reduced characterization data set comprises information on at least one of correction parameters associated with the probe tip module, receiver properties of the probe tip module, or transmitter properties of the probe tip module,
wherein the reduced characterization data set is insufficient for a complete description of the at least one of the correction parameters, the receiver properties, or the transmitter properties of the probe tip module, such that the reduced characterization data set has a reduced file size compared to a full characterization data set that is sufficient for a complete description of the at least one of the correction parameters, the receiver properties, or the transmitter properties of the probe tip module, wherein the reduced characterization data set is insufficient to determine the at least one of the correction parameters, the receiver properties, or the transmitter properties of the probe tip module,
wherein a default characterization data set is stored in the measurement instrument memory, wherein the default characterization data set comprises at least one of default correction parameters, default receiver properties, or default transmitter properties of the probe tip module, wherein the default characterization data set together with the reduced characterization data set is sufficient for a complete description of the at least one of the correction parameters, the receiver properties, or the transmitter properties of the probe tip module, and
wherein the reduced characterization data set comprises only deviations of the correction parameters of the probe tip module from the default correction parameters, of the receiver properties of the probe tip module from the default receiver properties, and/or of the transmitter properties of the probe tip module from the default transmitter properties.

9. The measurement system of claim 8, wherein the measurement instrument comprises a correction circuit, and wherein the correction circuit is configured to determine at least one correction parameter associated with at least the probe tip module based on the reduced characterization data set and based on the default characterization data set.

10. The measurement system of claim 9, wherein the at least one correction parameter is associated with at least one of a multi-port S-parameter, an ABCD-parameter, a Z-parameter, a resistance, an impedance, a gain, and/or a DC offset.

11. The measurement system of claim 9, wherein the correction circuit is configured to determine the at least one correction data set based on user input data.

12. The measurement system of claim 9, wherein the measurement instrument comprises an analysis circuit, wherein the analysis circuit is configured to analyze a measurement signal received from the probe system, thereby obtaining measurement data, and wherein the analysis circuit is configured to correct the measurement data based on the at least one correction parameter.

* * * * *